June 30, 1964 C. A. GRAN 3,139,219
MILK DISPENSER
Filed Oct. 3, 1960 2 Sheets-Sheet 1

INVENTOR:
Carl A. Gran,
BY
Bair, Freeman & Molinare
ATTORNEYS.

June 30, 1964 C. A. GRAN 3,139,219
MILK DISPENSER
Filed Oct. 3, 1960 2 Sheets-Sheet 2
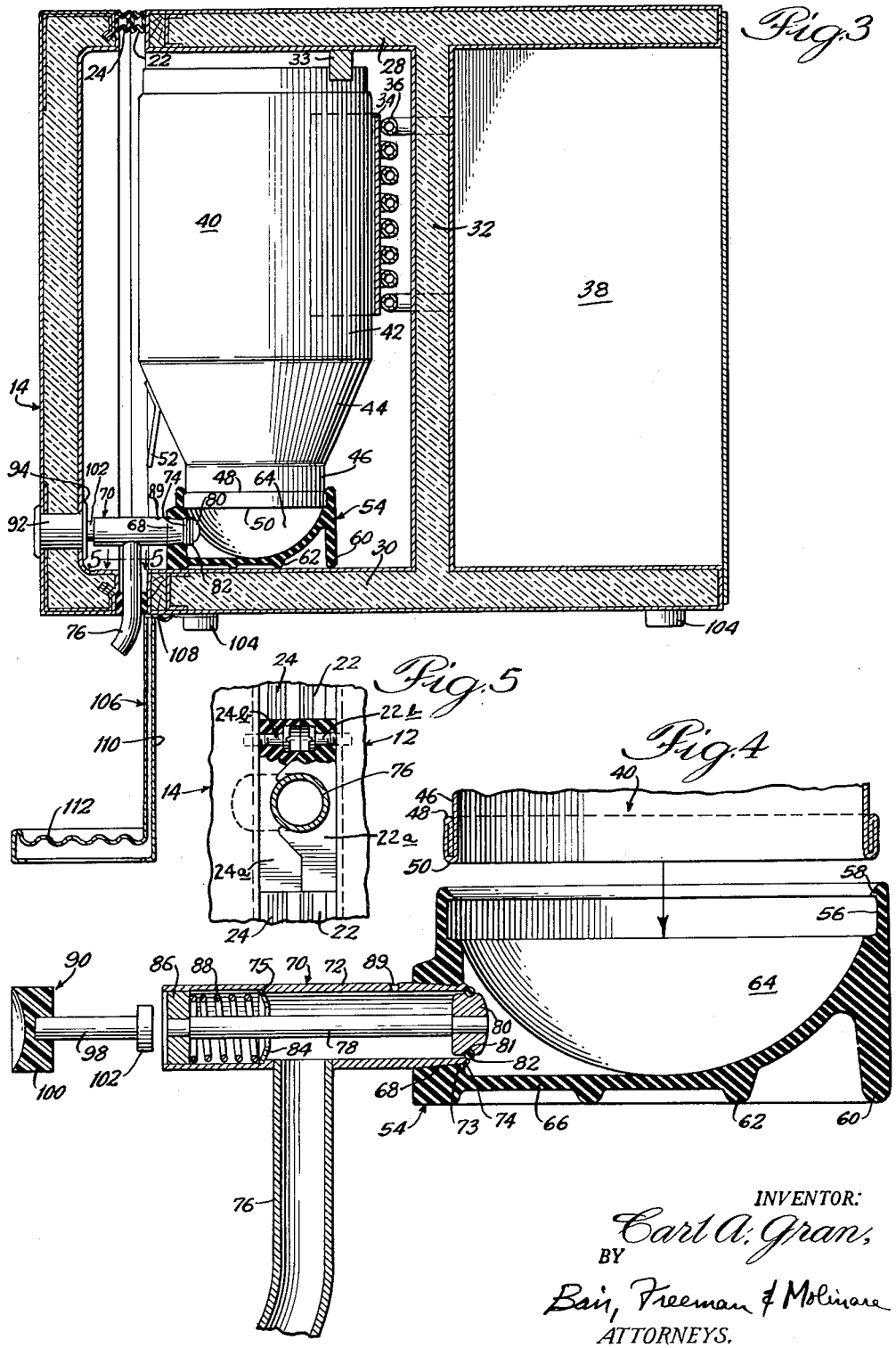
INVENTOR:
Carl A. Gran,
BY
Bair, Freeman & Molinare
ATTORNEYS.

United States Patent Office 3,139,219
Patented June 30, 1964

3,139,219
MILK DISPENSER
Carl A. Gran, Arlington Heights, Ill., assignor to Magi-Pak Corporation, a corporation of Delaware
Filed Oct. 3, 1960, Ser. No. 60,150
2 Claims. (Cl. 222—129.1)

This invention relates to a liquid dispenser and more particularly relates to a device for dispensing refrigerated liquid comestibles such as milk, fruit juices, and the like.

For a long time it has been appreciated that it would be desirable to provide, in the home, means for selective dispensing of refrigerated liquid comestibles such as milk, fruit juices, and the like. Although many have appreciated the desirability of such a device, little has been achieved in providing a workable system for accomplishing such ends.

One reason for previous failures has been the inability to provide a system susceptible of integration with the modes of distribution presently available. Another reason for previous failures has been the inability to provide a simple, inexpensive and efficient device for storing and dispensing of such refrigerated liquids. And another reason for previous failures has been the inability to provide a liquid dispensing means that is susceptible of complete and easy cleaning so as to insure against unsanitary conditions.

Thus, one object of this invention is to provide a dispenser for cooled liquid comestibles that is simple, inexpensive and efficient, and which particularly lends itself to integration with existing modes of distribution.

Another object of this invention is to provide a dispenser for liquid comestibles which is so simply constructed that housewives may easily effect complete cleaning of the dispenser toward the end of providing desirable sanitary conditions for the dispensing of the liquids.

A further object of this invention is to provide an improved and effective liquid dispensing mechanism that is characterized by its simplicity and effectiveness of operation and by its susceptibility of being completely cleaned.

The invention herein disclosed is particularly adapted for use as a milk dispenser in the home, or in food serving establishments, such as restaurants or the like. The milk dispensing problem is a particularly difficult one because of the fact that milk provides a medium highly susceptible to the growth of micro-organisms. Accordingly, the parts through which the milk flows must be capable of complete cleaning. While some systems have heretofore been provided for dispensing bulk milk in restaurants, such systems have been large and expensive and have not lent themselves to use in homes. Furthermore, such systems almost invariably require special containers for the milk, or require puncturing the milk can, and require using a flexible discharge tube that wears out due to use and is difficult to keep clean.

Thus, still another object of this invention is to provide a dispenser for milk that avoids utilizing milk containers that must be punctured, and provides, instead, milk containers that may be used with existing dairy equipment, and further provides milk discharging devices that have a long life and are easy to clean.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 3 is a vertical cross-section view through the cabinet of FIGURE 1 and shows parts of the dispensing means in cross-section and other parts in elevation;

FIGURE 4 is an enlarged cross-section view of the container-connector and liquid discharger shown in FIGURE 3, and illustrates the neck detail of the liquid container; and FIGURE 5 is a fragmentary cross-section taken on line 5—5 of FIGURE 3 illustrating the manner in which the liquid discharger extends outwardly of the cabinet.

Figure 1:
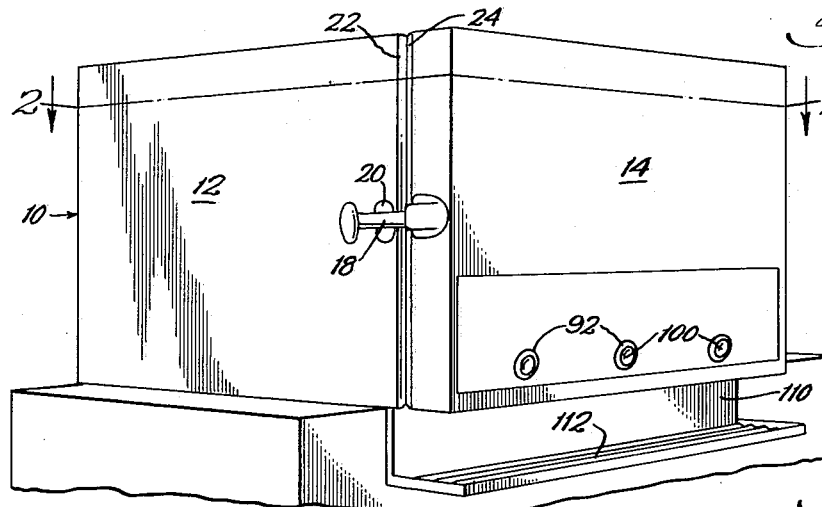
FIGURE 1 is a perspective view of a liquid dispenser cabinet embodying the features of this invention.

Referring now to the drawings, there is illustrated in FIGURE 1 a liquid dispenser, generally indicated at 10, shown mounted on a support, or base, B. The dispenser includes an open-sided cabinet 12 that may be selectively opened and closed by a complementary access door 14. The access door 14 is hinged at 16 at one edge thereof to the cabinet 12, and the opposite edge of door 14 carries a pivotally mounted clamp-type lock lever 18 of well-known type adapted to cooperate with an abutment, or hasp, 20 carried by cabinet 12. A sealing gasket means is provided between the door 14 and the cabinet 12 and includes a first gasket 22 mounted peripherally on cabinet 12 and a second gasket 24 mounted peripherally on door 14, the said gaskets being adapted to abut each other to provide a temperature-retaining seal therebetween.

The interior of the cabinet 12 is shaped to define a cooling chamber 26 that is bounded by insulated top and bottom walls 28 and 30, and by an insulated back wall 32. The upper side of chamber 26 is provided with a stabilizing bar 33 that is appropriately recessed to receive and stabilize a portion of the containers positioned in chamber 26. A chilling plate 34 is provided extending into the cooling chamber 26. Positioned adjacent and rearwardly of chilling plate 34 is a refrigerating coil 36 that is connected to standard refrigerating means (not shown) of well-known type that is designed to be housed in cabinet chamber 38. The refrigerating means may be electrically energized by appropriate means and operates to effect refrigeration through coil 36 and chilling plate 34 so as to cool the interior of chamber 26.

Within the chamber 26 there is provided one or more liquid carrying containers indicated at 40. Although the containers 40 are shown in inverted position in the figures, the containers will be described as if they were in their normal, upright, position. Each container 40 has a lower portion 42, of greatest dimension and cross-section which extends upwardly over the major portion of the height of the container, a middle portion 44, of frusto-conical, or upwardly converging form, and an upper constricted neck portion 46. The neck portion may be turned over outwardly as shown, or may be beaded, to provide a peripheral shoulder 48 located outwardly of the neck and spaced from the upper terminal edge 50 of the container. A carrying handle 52 is appropriately welded to the exterior of middle portion 44 and is shaped and arranged to be located within the confines of the projected periphery of lower portion 42 and is spaced below the shoulder 48.

A connector, generally indicated at 54, is attached to the open-ended, inverted neck portion of the container 40. The connector 54 is preferably formed of rubber or the like, and is provided on its inner side with an internal circular recess 56 that is bounded on its upper edge by a peripheral retainer flange 58 that is adapted to grippingly engage and cooperate with the peripheral shoulder 48 defined on the container to define a liquid-tight seal between the container and the connector. The outer side of the connector 54 is shaped to provide an outer circular support ring, or portion, 60 and an inner circular support ring, or portion 62, thereby providing support means for supporting the inverted container on a flat surface as seen in FIGURE 3. The inner side of connector 54 that is below the circular recess 56 is provided with a concavity 64 which forms part of a plenum chamber. The connector 54 is provided with a laterally extending portion 66 having a laterally opening aperture 68 therethrough which communicates with plenum 64 and within which is removably positioned a liquid dispenser generally indicated at 70. The concentric support rings 60 and 62 serve to reinforce the concave plenum chamber 64.

The dispenser 70 is selectively actuatable and includes an elongated valve tube 72 that is formed with a flared portion at one end thereof for cooperative engagement with an inner shoulder portion 73 on connector 54. The valve tube is provided with a first, exterior, valve seat 74 at the said one end of tube 72, and a second, interior, valve seat 75 of greater dimension than the first valve seat between the ends of tube 72. A discharge tube 76 communicates with the interior of valve tube 72 at a point on the underside of tube 72 located between the two valve seats 74 and 75. Positioned axially within tube 72, in spaced relation to the walls of tube 72, is an elongated stem 78 having a valve head 80 axially fixed on one end thereof. The head 80 is slightly smaller than the one end of tube 72, but the head 80 is grooved at 81 to carry therein an O-ring 82 that projects outwardly sufficiently to sealingly seat against first valve seat 74. Slidably mounted on stem 78 is a washer 84 that is adapted to sealingly seat against valve seat 75. A push button 86 is axially fixed on the outer end of stem 78 and is of a dimension just slightly smaller than the interior dimension of tube 72. A compressed coil spring 88 is positioned between push button 86 and washer 84.

The foregoing arrangement provides a simple and effective valve that may be easily assembled and disassembled for the purposes of cleaning. By pressing in on push button 86, the O-ring 82 is spaced away from its valve seat 74, and by merely removing the O-ring 82 from head 80, the entire stem 78 and all parts thereon may be removed from tube 72. This leaves the tube 72 and discharge spout 76 free to be completely cleansed, and the individual parts on the valve stem 78 may also be completely cleansed. To reassemble, the parts are inserted through the left hand end of tube 72, as viewed in FIGURE 4, and the head 80 is projected sufficiently forward to permit assembling of the O-ring 82 thereon, whereupon the valve is ready for delivery of liquid therethrough.

The upper side of valve tube 72 is provided with a small vent aperture 89 that is located outwardly of the connector 54. When the valve is pressed inwardly to permit flow of liquid through the discharge spout 76, the small vent 89 permits air to enter into connector 54 to pass to the interior of the container 40, thereby permitting an even flow of the liquid being dispensed.

The arrangement of parts is such that when a plurality of containers 40 are positioned within the chamber 26, the said valve portion of each dispenser 70 is located wholly within the chamber 26 with the outer end of each valve tube 72 closely adjacent the inner side of door 14. Each discharge tube 76 is positioned in the plane between the gaskets 22 and 24, and those gaskets may be appropriately relieved or apertured to permit the discharge tube to project therebetween to extend outwardly of the dispenser 10. Alternatively, and as shown in FIGURE 5, adjacent segments of gaskets 22 and 24 may be supplanted by tube-embracing, complementary, pre-shaped, solid rubber segments 22a and 24a that are appropriately held in position respectively on cabinet 12 and door 14 by any means such as, for example, by attaching bolts 22b and 24b.

Figure 2:
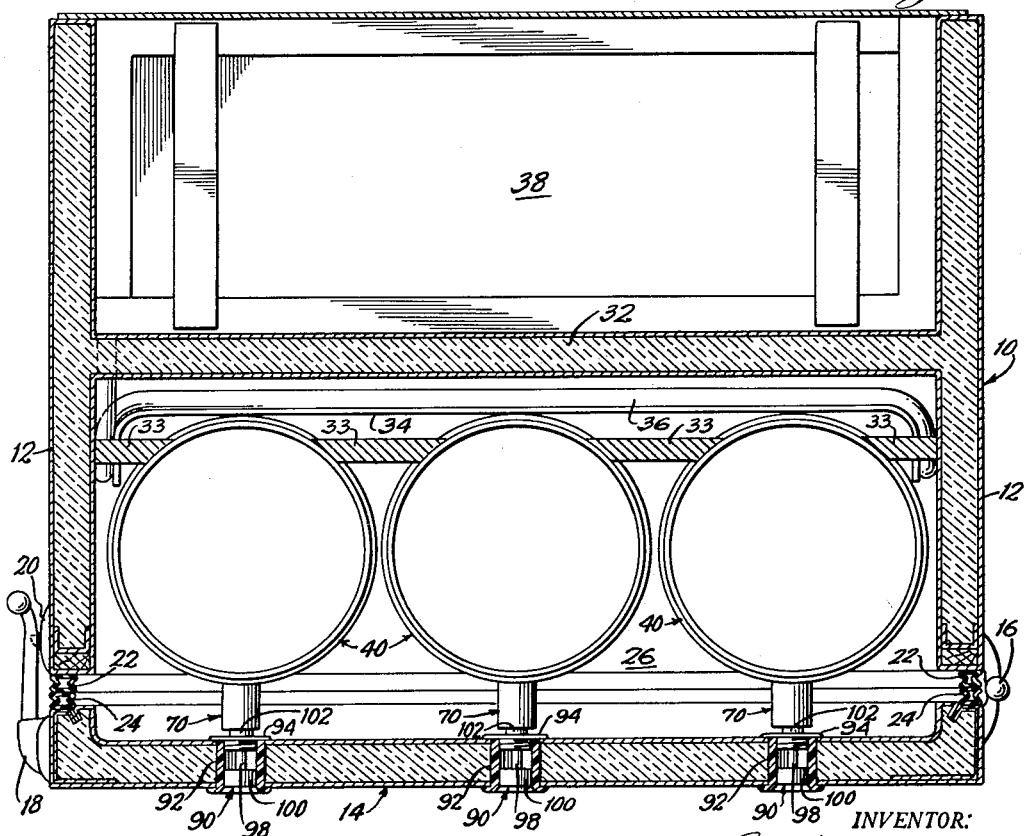
FIGURE 2 is a cross-section view taken on line 2—2 of FIGURE 1.

The door 14 carries therein a plurality of actuators 90 positioned to operate the valves of the dispensers 70. As best illustrated in FIGURES 2 and 3, the door 14 is insulated and is provided with a plurality of sleeves 92, the inner ends of which are closed off by washers 94 that are attached, by threading or the like, to sleeves 92. A stem 98 slidably extends through the center hole of washer 94 and carries thereon an outer head 100, and inner head 102 that is smaller than push button 86 and is adapted to be positioned closely adjacent thereto. The outer head 100 slidably fits within sleeve 92 to provide a neat installation. When the door 14 is closed, each inner head 102 is positioned closely adjacent and in register with a push button 86 so that by pushing inwardly on outer head 100, the valve of the dispenser 70 is activated to provide for discharge of liquid from the container through the discharge spout 76.

In the form of the device shown herein, the cabinet is provided with a plurality of support feet 104. A receptacle support 106 having an upper flange 108 is secured thereby to the underside of cabinet 12 so as to be spaced above the support surface for the cabinet feet 104. There is a depending upright wall 110, the lower end of which turns outwardly to define a support shelf 112 upon which a receptacle may be positioned to receive the liquid being discharged through a discharge tube 76.

The containers 40 preferably are formed of stainless steel or the like to provide for long life and to insure acceptability by local health departments. Preferably the containers are of a 5-quart capacity and are of a design to permit of use with automatic filling equipment, automatic washing equipment, and standard carrying cases utilized by most dairies. The containers may be appropriately capped, or may be sealed with a thin aluminum disc that is secured by heat sealing, or the like, to the circular terminal edge 50.

To use the packaged container that has been delivered by a dairy or other food packaging establishment, the closure cap is removed from the container and discarded and a sanitary snap-on connector 54, carrying a dispenser 70, is fitted onto the open upper end of the container 70. The container is then inverted and placed in position within the dispenser 10, the door 14 is closed, and the food product is ready to be dispensed. All of the food product in the container is maintained under refrigeration until the discharge valves are selectively actuated from exteriorly of the container. The dispensing is a gravity operation and the vent passageway to the interior of container 40 is open only when the valve is open.

There are many advantages inherent with the use of a stainless steel dispensing can 40, in that such a container permits of high-speed filling and high-speed automatic capping. The can eliminates the possibility of leakage from paper containers or breakage of glass containers. The long life of the stainless steel container effects substantial savings over long use, when compared with paper and glass containers. The steel container can be easily sterilized and is preferably provided with a mirror finish to make an attractive package. The use of the steel container also permits of greater volume capacity per unit that is designed for use with existing equipment than is possible with paper or glass, and the can may be precision-constructed with close tolerances for high-speed automatic handling. Furthermore, the steel container provides a permanent handle for easy handling, as contrasted with the handle means presently available for paper and glass containers. The container is ideal for automatic packaging, as it may be dropped into carrying cases and it has a large diameter neck for high-speed filling. All inside surfaces are visible for easy inspection and it is easily cleaned by high-speed techniques such as by ultrasonic cleaning baths.

While there has been shown and described a particular embodiment of this invention, it will be obvious to those skilled in the art that various changes and modifications may be made therein without departing from the invention and, therefore, it is intended in the appended claims

What I claim as new, and desire to secure by Letters Patent of the United States, is:

1. In a dispenser for liquid comestible including means for cooling such liquid comestible and valve means for selectively dispensing same, the improved combination of: cabinet means defining an open-sided cooling chamber and a horizontal support for supporting liquid container means thereon, and a selectively openable access door for closing said cooling chamber; liquid container means defining a lower support means thereon adapted to be positioned on the support in said cooling chamber and providing a laterally-opening discharge aperture therein; a valved discharge cartridge providing both flow control means and a discharge spout therefrom, said valved discharge cartridge being removably affixed into the laterally-opening discharge aperture and adapted for ready removal thereof from the container means to permit of simple and ready cleaning of all the interior surfaces of the liquid container means to permit re-use of said container means, said flow control means including a reciprocable valve means; and a valve actuator carried in the access door to provide selective control for said valve means from exteriorly of the dispenser when the door is closed, said valve actuator including a reciprocable stem positioned to register substantially axially with said reciprocable valve means.

2. In a dispenser for liquid comestible including means for cooling such liquid comestible and valve means for selectively dispensing same, the improved combination of: cabinet means defining an open-sided cooling chamber and a horizontal support for supporting liquid container means thereon; a selectively openable access door for closing said cooling chamber, and gasket means between said door and said cabinet means providing a temperature, retaining seal therebetween; liquid container means defining a lower support means thereon adapted to be positioned on the horizontal support in said cooling chamber and providing a laterally-opening discharge aperture therein; valved discharge means providing both flow control means and a discharge spout therefrom, said discharge means including an elongated tubular member detachably engaged at its inner end within the laterally-opening aperture of the container means and adapted for ready removal from said container means to permit of cleaning of all the interior surfaces of the container means to permit re-use of said container means, a valve seat defined at said inner end of said tubular member, an elongated valve stem extending axially through said tubular member in spaced relation to the walls of said tubular member, a resilient seal removably carried on the inner end of said valve stem and projecting radially outwardly therefrom for cooperation with the valve seat to selectively close the tubular member, spring means normally biasing the resilient seal against said valve seat, and the resilient seal also serving to maintain the valved discharge means assembled.

References Cited in the file of this patent

UNITED STATES PATENTS

| | | |
|---|---|---|
| 79,723 | Beach | July 7, 1868 |
| 893,254 | Langfitt | July 14, 1908 |
| 997,836 | Larsen et al. | July 11, 1911 |
| 1,950,133 | Blood | Mar. 6, 1934 |
| 2,031,283 | Scofield | Feb. 18, 1936 |
| 2,117,791 | Damsel et al. | May 17, 1938 |
| 2,274,409 | Harbison | Feb. 24, 1942 |
| 2,508,492 | Chace | May 23, 1950 |
| 2,554,570 | Harvey | May 29, 1951 |
| 2,764,324 | Landreth | Sept. 24, 1956 |
| 2,777,304 | Nave | Jan. 15, 1957 |
| 2,808,185 | Norris et al. | Oct. 1, 1957 |
| 2,830,737 | Brown | Apr. 15, 1958 |
| 2,939,611 | Nebinger | June 7, 1960 |
| 2,962,194 | Cotter | Nov. 29, 1960 |